US009557711B2

(12) United States Patent
Rakhovsky et al.

(10) Patent No.: US 9,557,711 B2
(45) Date of Patent: Jan. 31, 2017

(54) METHOD OF STATIC SCALING OF IMAGE IN HOLOGRAPHIC LITHOGRAPHY

(71) Applicant: Vadim Rakhovsky, Moscow (RU)

(72) Inventors: Vadim Rakhovsky, Moscow (RU); Mikhail Borisov, Moscow (RU); Aleksey Shamaev, Moscow (RU); Dmitry Chelyubeev, Dmitrov (RU); Aleksandr Gavrikov, Kemerovo (RU); Vitaly Chernik, Omsk (RU); Peter Mikheev, Moscow (RU)

(73) Assignee: Vadim Rakhovsky, Moscow (RU)

( * ) Notice: Subject to any disclaimer, the term of this patent is extended or adjusted under 35 U.S.C. 154(b) by 351 days.

(21) Appl. No.: 14/267,884

(22) Filed: May 1, 2014

(65) Prior Publication Data

US 2015/0185697 A1    Jul. 2, 2015

Related U.S. Application Data

(63) Continuation-in-part of application No. 14/142,778, filed on Dec. 28, 2013, now abandoned.

(51) Int. Cl.
*G03H 1/08*    (2006.01)
*G03H 1/16*    (2006.01)
(Continued)

(52) U.S. Cl.
CPC .......... *G03H 1/0891* (2013.01); *G03H 1/0808* (2013.01); *G03H 1/16* (2013.01); *H01M 2/145* (2013.01); *H01M 2/1653* (2013.01); *B29C 47/0021* (2013.01); *B29C 47/0057* (2013.01); *B29C 47/0898* (2013.01); *G03H 2001/0816* (2013.01); *H01M 10/052* (2013.01)

(58) Field of Classification Search
CPC ...... G03H 1/0891; G03H 1/10; G03H 1/0808; G03H 1/16; G03H 2001/0816; H01M 2/145; H01M 2/1653; B29C 47/0021; B29C 47/0057; B29C 47/0898
USPC .......................................... 359/9, 10, 11, 12
See application file for complete search history.

(56) References Cited

U.S. PATENT DOCUMENTS 4,592,618 A * 6/1986 Huignard ............. G03H 1/0248
                                            359/10
5,416,616 A * 5/1995 Jenkins .................... G02B 5/32
                                            359/10
(Continued)

*Primary Examiner* — Bumsuk Won
*Assistant Examiner* — William R Alexander
(74) *Attorney, Agent, or Firm* — TransPacific Law Group; Pavel I. Pogodin, Esq.

(57) ABSTRACT

Proposed is a method of static scaling of an image in holographic lithography. The method consists of generating a final virtual digital hologram of the original pattern through a sequence of mathematical calculations with participation of a virtual coherent light source having a predetermined wavelength $\lambda_1$ and producing an actual hologram on the basis of the virtual digital hologram of the original pattern. The obtained hologram can be used for forming an actual original pattern in a predetermined size. When it is necessary to produce the original pattern in another size, this can be done by static scaling by merely selecting another wavelength for the laser source with adjustable wavelength. The method allows determining the wavelength range in which scalability is possible with substantially homothetic transformation of the image.

12 Claims, 8 Drawing Sheets

(51) Int. Cl.
*H01M 2/14* (2006.01)
*H01M 2/16* (2006.01)
*B29C 47/00* (2006.01)
*H01M 10/052* (2010.01)
*B29C 47/08* (2006.01)

(56) References Cited

U.S. PATENT DOCUMENTS

| | | | | |
|---|---|---|---|---|
| 6,525,875 | B1* | 2/2003 | Lauer | G03H 1/0443 |
| | | | | 359/368 |
| 6,819,469 | B1* | 11/2004 | Koba | G03F 7/70291 |
| | | | | 359/290 |
| 6,873,444 | B1* | 3/2005 | Guletsky | G03H 1/08 |
| | | | | 359/11 |
| 2007/0053029 | A1* | 3/2007 | Raguin | G03H 1/0406 |
| | | | | 359/12 |
| 2008/0037084 | A1* | 2/2008 | Kobayashi | G02B 5/32 |
| | | | | 359/15 |
| 2010/0232000 | A1* | 9/2010 | Futterer | G02B 26/005 |
| | | | | 359/9 |
| 2011/0300490 | A1* | 12/2011 | Rachet | G02B 21/0032 |
| | | | | 430/322 |
| 2015/0146032 | A1* | 5/2015 | Rime | H04N 7/01 |
| | | | | 348/222.1 |

* cited by examiner

METHOD OF STATIC SCALING OF IMAGE IN HOLOGRAPHIC LITHOGRAPHY

CROSS-REFERENCE TO RELATED PATENT APPLICATION

The present U.S. patent application relies upon, claims the benefit of priority from, and is a continuation-in-part of U.S. patent application Ser. No. 14/142,778 filed on Dec. 28, 2013, the entire disclosure of which is incorporated by reference herein.

BACKGROUND OF THE INVENTION

Field of the Invention

The present invention relates to the semiconductor industry, in particular, to microlithography, and more specifically to a method of static scaling of an image in holographic lithography.

Description of the Related Art

Lithography and, in particular, photolithography is a well-known technique in semiconductor and printed circuit board (PCB) manufacture for creating electrical components and circuits. Predominantly, used for this purpose is projection photolithography, which involves projecting a mask image on the surface of a substrate, which has been covered by a layer of photoresist, before exposing both a mask and a substrate to light. As a rule, the projected image is optically reduced with a factor of 5 or more and for obtaining an image of high quality and accuracy the process dictates the use of very complicated, precision, and extremely expensive optical equipment operating in short wavelengths of ultraviolet range of spectrum, e.g., with $\lambda$ of 193 nm or shorter. As a rule, the light sources used in the process are lasers.

The areas of photoresist that are exposed to light react and change chemical properties of the coating layer. The photoresist is then developed in order to remove either the exposed portions of photoresist for a positive resist or the unexposed portions for a negative resist. The pattern formed in the photoresist allows further processing of the substrate, such as, but not limited to, etching, deposition, or implantation.

At the present time, the above-mentioned projection photolithography is a basic photolithography technique used for production of integrated circuits. However, further development in the field of integrated circuit associated with demand for higher degree of integration and increase in complexity of the integrated circuits put forward the goals which in case of projection lithography leads to extraordinary material and intellectual expenditures.

One of practical problems of projection lithography is complexity of image scaling in sequential operations performed with the use of set of different masks. The scales of images produced with the use of masks installed in the same position of lithograph may have deviations that occur during the manufacture of the masks, even in the same process. Such deviations may be caused also by the use of different mask manufacturing tools, etc. The same relates to the alignment marks for registering positions of the mask in the lithograph.

In practical projection lithography, including the most advance lithography with the critical dimensions of image elements of the order of tens nanometers, the above problem is solved by microadjustment of the image scale by minutely displacing the mask in direction of the optical axis (in the Z-axis direction perpendicular to the image plane). In order to satisfy precision mask scaling requirements these displacements are carried out with the use of extremely complicated and expensive equipment since such an adjustment involves the use of a set of complicated micro-interferometric devices and tools for micronanopositioning. A provision of such an equipment in combination with the basic optical components of the system is a decisive factor in determining the manufacturing cost of the final product.

On the other hand, known in the art is so-called holographic lithography which to some extent is free of problems associated with the projection lithography. In holographic lithography the image formation process on a semiconductor substrate is carried out by restoring an image recorded on a special holographic mask with the use of a highly coherent laser light. The holographic mask per se is prepared by using special calculation procedures and is physically manufactured by technology which is close to the manufacture of mask in accordance with conventional projection lithography. It should be noted that the topology of the images of the holographic masks does not have anything in common with the mask topology used in the projection lithography where the mask image is similar to the original image. On the other hand, the use of the holographic masks provides significant advantages as compared to the masks of the projection lithography, i.e., the holographic masks may have several hundred longer lifetime than the masks of the projection lithography. Furthermore, defects of mask images in holographic mask practically do not affect the accuracy and quality of the target image. Another essential advantage of the holographic masks is simplicity of manufacture and low production cost. Furthermore, the topology of the holographic masks makes it possible to reproduce some image elements unattainable with the projection lithography technique.

However, until recent time the holographic lithography did not find practical application because methods for calculation of mask pattern suitable for practical application, even for masks of an average complexity, required so much time that it was practically impossible for actual application.

Nevertheless, attempts to solve the above problem of holographic lithography have been undertaken and even successfully accomplished as disclosed in the U.S. patent application Ser. No. 14/142,776 filed on Dec. 28, 2013 by Vadim Rakhovsky, et al. This application describes a method of manufacturing a holographic mask capable of producing an image pattern that contains elements of a subwavelength size along with decreased deviations from the original pattern. The original pattern is converted into a virtual electromagnetic field and is divided into a set of virtual cells with certain amplitudes and phases, which are mathematically processed for obtaining the virtual digital hologram. The calculation of the latter is based on parameters of the restoration wave, which is used to produce the image pattern from the mask, and on computer optimization by variation of amplitudes and phases of the set of virtual cells and/or parameters of the virtual digital hologram for reaching a satisfactory matching between the produced image pattern and the original pattern. The obtained virtual digital hologram provides physical parameters of the actual digital hologram that is to be manufactured.

SUMMARY OF THE INVENTION

One practical problem of conventional projection lithography is possibility of image scaling in the image-forming scale in various sequential operations performed with the use of set of different masks. The scales of images produced with the use of masks installed in the same position of lithograph may have deviations that occur during setting of the equipment and in the manufacture of the masks, even in the same process. Such deviations may be caused also by the use of different mask manufacturing tools, etc. The same relates to the alignment marks for registering positions of the mask in the image plane.

In practical projection lithography, including the most advanced lithography with the critical dimensions of image elements of the order of tens nanometers, the above problem is solved by microadjustment of the image scale by minutely displacing the mask in direction of the optical axis (in the Z-axis direction perpendicular to the image plane). In order to satisfy precision mask scaling requirements these displacements are carried out with the use of extremely complicated and expensive equipment since such an adjustment involves the use of a set of complicated micro-interferometric devices and tools for micronanopositioning. A provision of such an equipment in combination with the basic optical components of the system is a decisive factor in determining the manufacturing cost of the final product.

On the other hand, the applicants have found that, as compared to the aforementioned projection lithography, the holographic lithography is more advanced with regard to the solution of mask scaling problem. More specifically, the applicants have found that the scaling of the image in different consecutive steps can be carried out statically, i.e., without any precision micromovements. In other words, as disclosed in aforementioned U.S. patent application Ser. No. 14/142,776 filed by the same applicants on Dec. 28, 2013 and entitled METHOD FOR SYNTHESIS AND FORMATION OF A DIGITAL HOLOGRAM FOR USE IN MICROLITHOGRAPHY, there exist a possibility of scaling by merely changing the wavelength but preserving the wavelength coherence.

The applicants also found that such a wavelength adjustment can be carried out without deteriorating image quality only in a certain range of wavelength variations which can be determined by specific mathematical calculation procedure developed by the applicants. The above range depend on a number of parameters, e.g., dimensions and characteristics of the image pattern.

A practical holographic lithography machine is capable of statically scaling of the image by changing the wavelength of light used in the procedure and by using a parametric laser with a given degree of coherency and output power as well as with possibility of fixation and stabilization of the wavelength, etc.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The invention of the present patent application relates to the formation of a digital hologram for use in microlithography, and particularly to a method of scaling in image-alignment procedures used in the manufacturing stages of holographic lithography.

The method of the present invention application is explained below in detail in the form of sequential steps designated in alphabetic order.

Figure 1:
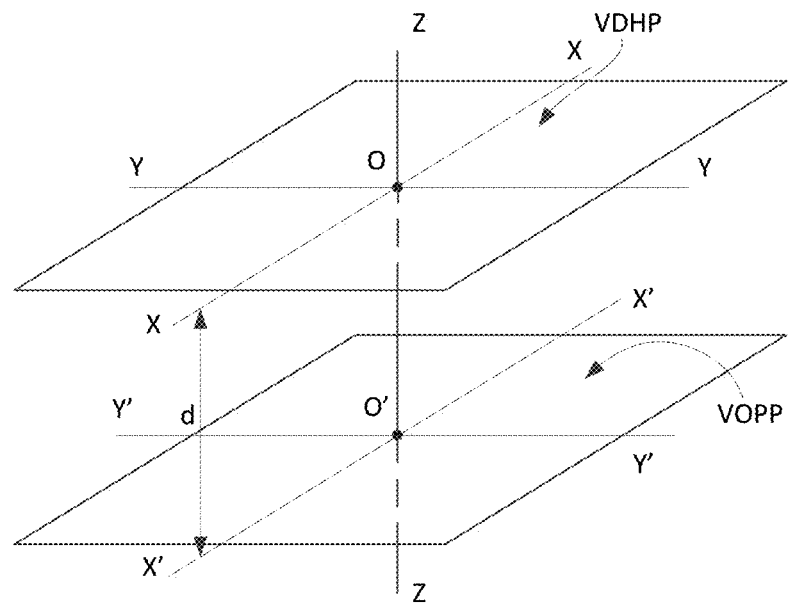
FIG. 1 is a perspective view of relative positions of a virtual hologram plane (VDHP) and a virtual original pattern plane in an X, Y, Z coordinate system.

The first step (a) consists of introducing an orthogonal coordinate system x, y, z having three mutually perpendicular axes X-X, Y-Y, and Z-Z, choosing a point O (see FIG. 1) on the axis Z-Z, and passing through this point O a virtual digital hologram plane (VDHP), which is perpendicular to the axis Z-Z and which is to be used as a plane of a virtual digital hologram (VDH) for assisting in manufacture of the actual digital hologram (not shown in FIG. 1).

The next step (b) consists of selecting an orthogonal coordinate system x', y', z having three mutually perpendicular axes X'-X', Y'-Y', and Z-Z, choosing a point O' on the axis Z-Z, which is spaced from the virtual digital hologram plane (VDHP) at a certain distance D, and passing through this point O' a virtual original pattern plane (VOPP), which contains a virtual original pattern and is perpendicular to said arbitrary axis Z-Z, and wherein the virtual original pattern that contains image elements is to be used for subsequent synthesis of the virtual digital hologram.

Figure 2:
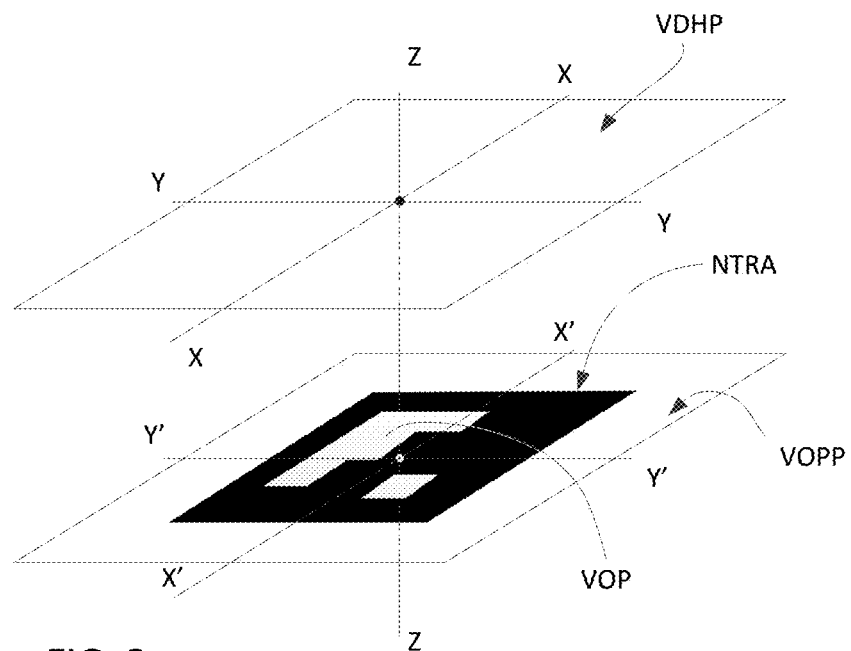
FIG. 2 is a perspective view of the position of a nontransparent restricted area (NTRA) in the virtual original pattern plane (VOPP) and position of the virtual original pattern (VOP) in the nontransparent restricted area (NTRA) of the virtual original pattern plane (VOPP).

The next step (c), which is shown in FIG. 2, consists of selecting a nontransparent restricted area (NTRA) in the virtual original pattern plane (VOPP) and placing the virtual original pattern (VOP) in the nontransparent restricted area (NTRA) of the virtual original pattern plane (VOPP). The virtual original pattern (VOP) is formed by virtual image elements (VIE). Let us designate distance from point O' to the most remote point O''' on the VIE FIG. 2 as δ (in order to simplify the drawings δ is not shown in the drawing). In other words, δ can be considered as a parameter of the virtual original pattern.

Figure 3:
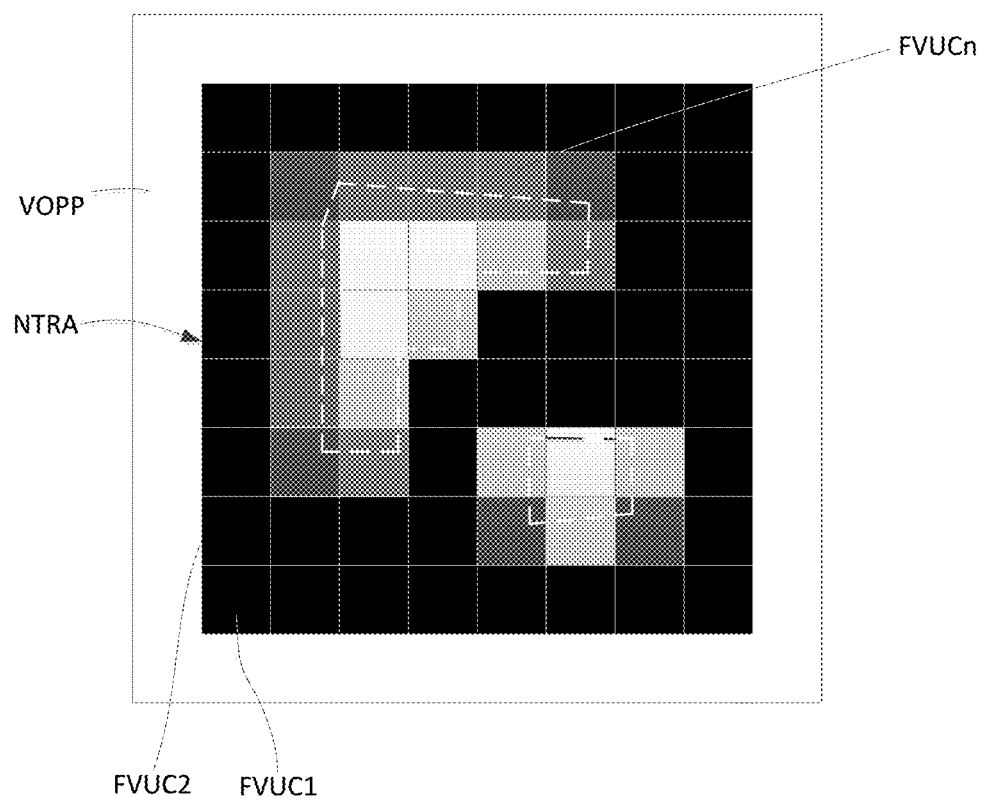
FIG. 3 is a top view of a step in which the first virtual net (FVN), which divides the nontransparent restricted area (NTRA) into a plurality of first virtual unit cells (FVUC1, FVUC2, ... FVUCm), is applied onto the virtual original pattern plane (VOPP).

In the next step (d), which is shown in FIG. 3, a first virtual net (FVN), which divides the nontransparent restricted area (NTRA) into a plurality of first virtual unit cells (FVUC1, FVUC2, . . . FVUCm), is applied onto the virtual original pattern plane (VOPP).

In the next step (e), the first virtual unit cells (FVUC1, FVUC2, . . . FVUCm) are classified into white first virtual unit cells such as a first white virtual unit cell (WFUC), black first virtual unit cells such as (BFUC), and grey first virtual unit cells such as (GFUC) (FIG. 3), wherein a white first virtual unit cell is obtained if a first virtual unit cell of the first net overlaps the virtual image elements of the original pattern, a black first virtual unit cell is obtained if a first virtual unit cell of the first net overlaps only a space between the adjacent virtual image elements, and a grey virtual unit cell is obtained if a first virtual unit cell of the first net overlaps both virtual image elements and a space between adjacent virtual image elements.

Figure 4:
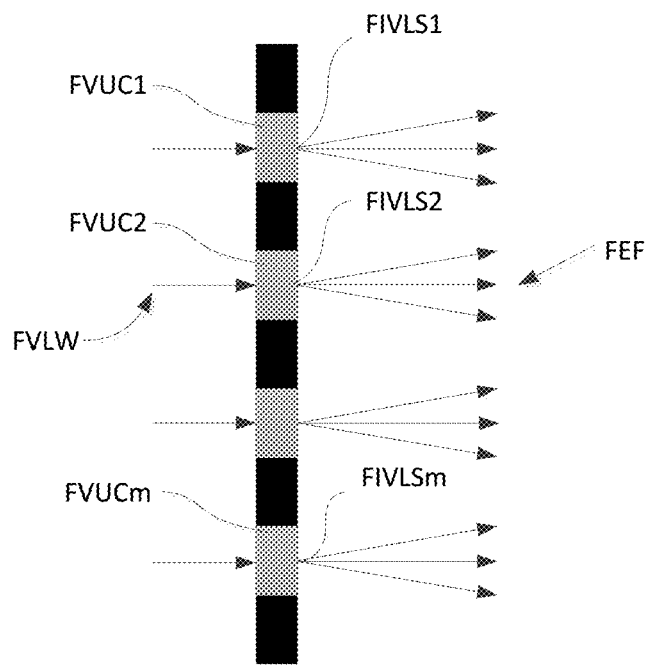
FIG. 4 is a side view showing passage of the first virtual light wave (FVLW) through the first virtual unit cells.

The next step (f) consists of presenting the virtual original pattern (VOP) in the form of a virtual digital amplitude-phase mask, wherein each first virtual unit cell is assigned a transmission value, wherein white first virtual unit cells (WFUC) are assigned a transmission value of 1.0, black first virtual unit cells (BFUC) are assigned a transmission value of 0.0, and grey first virtual unit cells (GFUC) are assigned a transmission value in the range of 0.0 to 1.0; all areas beyond the restricted area are assigned an amplitude value of 0.0; and wherein each first virtual unit cell has a function of a rotational phase shifter for shifting the phase in each respective first virtual unit cell when this first virtual unit cell passes the light of a first virtual light wave FVLW (FIG. 4) that has a given phase, amplitude and directional characteristic, which are changed individually in each first virtual unit cell when the first virtual light wave (FVLW) passes through this cell, whereby a plurality of first individual virtual light sources (FIVLS1, FIVLS2, . . . FIVLSm) selected from the group of point light sources and/or extended light sources is formed, wherein each first individual virtual light source of said plurality acquires a precalculated phase, amplitude and directional characteristic.

In the next step (g), an auxiliary correction of said acquired precalculated phase, amplitude and directional characteristic is performed for each first individual virtual light source of said plurality for obtaining a post-calculated distribution of said phase, amplitude and directional characteristic of the first individual virtual light sources (FIVLS1, FIVLS2, . . . FIVLSm) of said plurality.

The next step (h) consists of fixing obtained post-calculated distribution of said phase, amplitude and directional characteristic of the first individual virtual light sources (FIVLS1, FIVLS2, . . . FIVLSm) of said plurality, said first individual virtual light sources (FIVLS1, FIVLS2, . . . FIVLSm) generating a first electromagnetic field (FEF) in the virtual original pattern plane (VOPP). This first electromagnetic field (FEF) operates on a predetermined first wavelength $\lambda_1$.

In the next step (i), a second virtual net that divides the plane of a virtual digital hologram into a plurality of second virtual unit cells is applied onto the plane of the virtual digital hologram. This step is not illustrated because it looks similar to one shown in FIG. 3. In the second virtual units of the virtual digital hologram plane (VDHP), the first light sources of said plurality generate a second electromagnetic field (SEF). The second electromagnetic field (SEF) operates on the same first wavelength $\lambda_1$.

The step (j) consists of calculating amplitude and phase of the second electromagnetic field (SEF) in the virtual digital hologram plane (VDHP) from the first light sources of said plurality.

Figure 5:
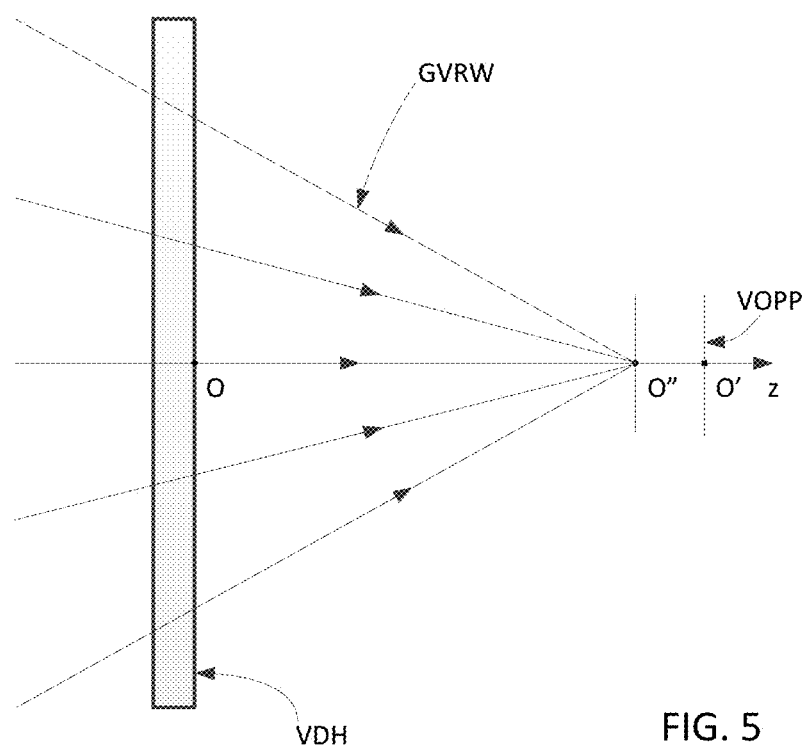
FIG. 5 is a side view that shows passage of a given virtual restoration wave ((GVRW)) through the virtual digital hologram for subsequent restoration of a final virtual image (FVI).

The next step (k), which is shown in FIG. 5, consists of providing a given virtual restoration wave (GVRW) for subsequent restoration of a final virtual image FVI.

In the invention of the first patent application (U.S. patent application Ser. No. 14/142,776) all processes were performed by using light of the same wavelength, which in the present application is referred to as wavelength $\lambda_1$.

However, the applicants have found that when restoration of the image is carried out by using another wavelength, e.g., $\lambda_2$, the image, although preserve the general topology of the initial pattern, is reproduced in a changed scale. In this, the scaling coefficient K is equal to $\lambda_2/\lambda_1$. In other words, an increase in $\lambda_2$ leads to increase of the image scale, and vice versa, a decrease in $\lambda_2$ decreases the scale of the image. It should be noted that at this stage of the process images are still virtual images.

The applicants also have found that in such scaling the wavelength $\lambda$, and hence the scaling coefficient $K=\lambda_2/\lambda_1$, can be changed only to a certain limit and that in the area beyond this limit the restored virtual image is distorted to the extent that such an image restoration process becomes unacceptable for practical application. Therefore, the allowable range for selection of $\lambda_2$ in which the original topology of the pattern is preserved should be chosen with reference to a combination of certain parameters of the process and the original pattern.

Figure 6A:
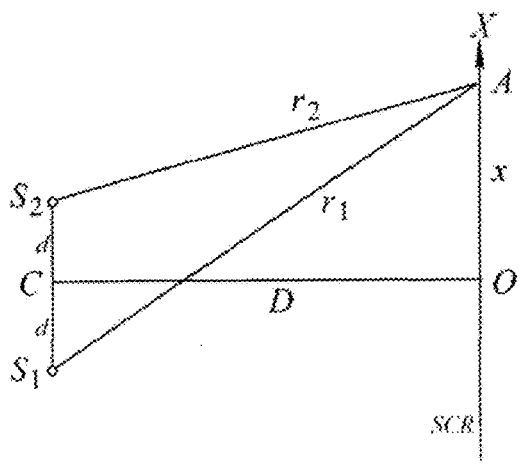
FIG. 6A is a diagram that explains the interference of light from two closely located coherent light sources on a screen.

We can propose the following explanation of the above-mentioned phenomenon. Let us consider a simple example of interference of two coherent light sources $S_1$ and $S_2$ having the same intensity $I_1$ at a distance of $2d$ from each other. Let us assume that these are identical light sources $S_1$ and $S_2$, where x is a current coordinate of a point on the screen SCR (see FIG. 6A). In this drawing, $r_2$ is a distance to the current point from source $S_2$, $r_1$ is a distance from source $S_1$ to the current point, and D is a distance from plane of the light sources to the screen.

It is known that if values of d and x are small compared to D, the divergence angle α of the interference rays change insignificantly. Then the distribution of intensity of light on the screen SCR caused by the interference can be expressed as follows:

$$I = 2I_1\left(1 + \cos\left(\frac{2\max}{\lambda}\right)\right) \quad (1)$$

If at other conditions being unchanged the wavelengths of the light sources are changed, the interference picture will change as well and will undergo practically homothetic transformation (in homothetic transformation any figure transforms into conformable one) with the center in point O.

This is because at constant α in the first approximation the interference member $$\cos\left(\frac{2\max}{\lambda}\right)$$

depends only on $$\frac{x}{\lambda}.$$

Thus, at other conditions being unchanged, the change of the wavelength is a subject to homothetic transformation with a certain wavelength change coefficient.

More specifically, under condition that d is much less than D, the interference picture for two spherical coherent light sources can be written as follows:

$$I = I_1\left(\frac{1}{r_1^2} + \frac{1}{r_2^2} + 2\frac{\cos(\Phi_1 - \Phi_2)}{r_1 r_2}\right), \quad (2)$$

where $\Phi_1 = kr_1$ and $\Phi_2 = kr_2$ are phases of the interfering waves.

Let us consider the $\Phi_1 - \Phi_2$:

$$\Phi_1 - \Phi_2 = k(\sqrt{D^2 + (x+d)^2 + y^2} - \sqrt{D^2 + (x-d)^2 + y^2}) \quad (3),$$

where y is an axis that exits from point O normally toward a viewer.

After a series of conversions of the above formula, it can be shown that $$\Phi_1 - \Phi_2 \approx 2kx\sin(A) + \frac{kx\delta^2}{D^2}\sin(2A)\cos(A), \quad (4)$$

where δ is a half image size, k is a wave vector, and A is an aperture angle that can be found from the following formula:

$$1 + \left(\frac{d}{D}\right)^2 = 1 + tg^2 A = \frac{1}{\cos^2 A}. \quad (5).$$

Within the scope of an image forming procedure in application to holographic lithography, parameter A can be considered constant.

The first member of the equation (4) possesses a property of full scalability. If $k\delta^3/D^2$ is much less than 1, one can expect condition of full scalability. Although this condition with regard to limitations of the process parameters is very strict, nevertheless, it makes possible to determine requirements which have to be satisfied for providing scalability of images with change of the wavelength in the image process formation by holographic lithography.

The above principle makes it possible to define allowable limits of the wavelength variation range in which complete scalability is possible, provided that the following condition is observed: $k\delta^3(K^2-1)/D^2$ is much less than 1, where K is aforementioned scaling coefficient: $K=\lambda_2/\lambda_1$.

In the next step (I), the possible interval $[\lambda_{min}, \lambda_{max}]$ for $\lambda_2$ deviations is determined on the basis of the aforementioned process parameters.

FIG. 5 shows that the given virtual restoration wave (GVRW) propagates in the direction from (VDHP) to (VOPP) and comprises a spherical or near-spherical wave (or, in a general case, a nonspherical wave) that converges to point O″, which may or may not coincide with point O' on the virtual original pattern plane (VOPP). Designations (VDH), (VOPP), O, O', and z are the same as in FIG. 1.

Figure 6B:
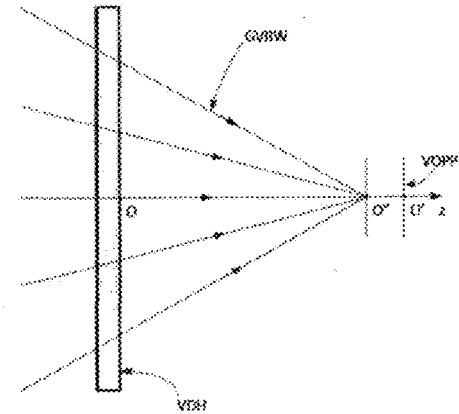
FIG. 6B is a side view that shows inversion of the given virtual restoration wave ((GVRW)) into a virtual reference wave (VRF) to be used for calculating the virtual digital hologram (VDH).

The next step (m) (FIG. 6B) is inverting the given virtual restoration wave (GVRW) into a virtual reference wave (VRF) to be used for calculating the virtual digital hologram (VDH).

Figure 7:
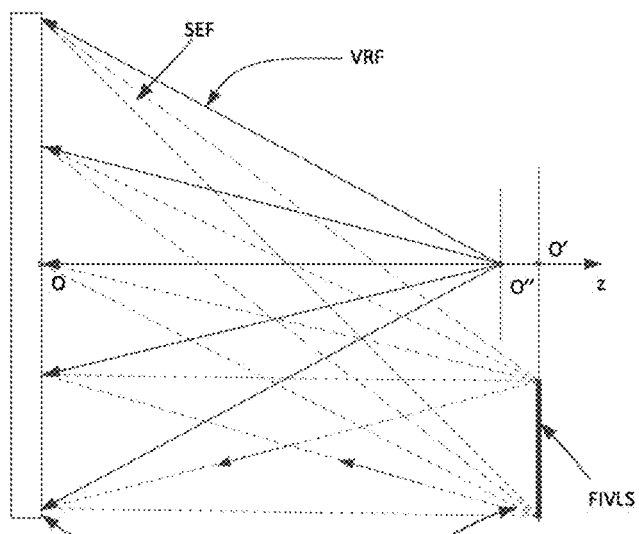
FIG. 7 is a side view that shows an addition of the virtual reference wave (VRF) to the second electromagnetic field (SEF) obtained in the second virtual unit cells.

In the next step (n), the virtual reference wave (VRF) is added to the second electromagnetic field (SEF) obtained in the second virtual unit cells for calculating interference amplitudes and phases obtained as a result of interference of the second electromagnetic field (SEF) obtained from the first virtual light sources with the virtual reference wave VRF. This is shown in FIG. 7. This drawing illustrates a case wherein point O″ is in the virtual original pattern plane (VOPP).

The next step (o) consists of calculating the values of the virtual digital hologram (VDH) in the second virtual unit cells based on the interference amplitudes and phases in each second virtual unit cell.

Figure 8:
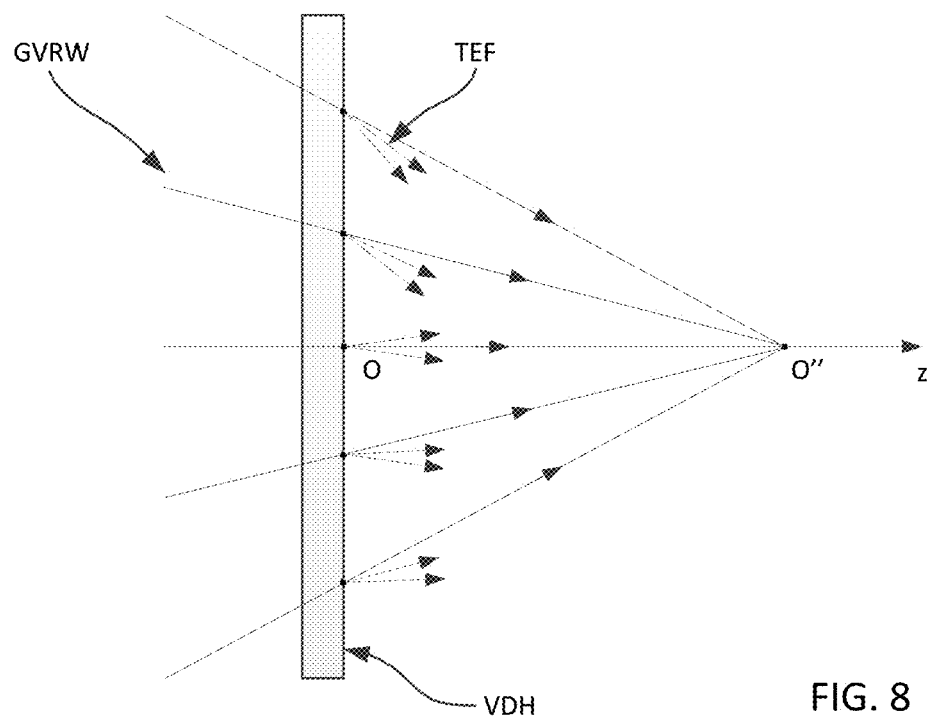
FIG. 8 is a side view that shows passage of a given virtual restoration wave ((GVRW)) through the virtual digital hologram plane (VDHP) for forming a plurality of second individual virtual light sources in the second virtual unit cells.

Next, in step (p) (FIG. 8), the given virtual restoration wave (GVRW) passes through the virtual digital hologram plane (VDHP), thus forming a plurality of second individual virtual light sources (SIVLS1, SIVLS2, ... SIVLSk) in the second virtual unit cells. The second individual virtual light sources (SIVLS1, SIVLS2, ... SIVLSk) generate a third electromagnetic field (TEF) in the virtual digital hologram plane (VDHP).

In step (q), a final virtual image plane (FVIP) is selected for subsequent formation of the final virtual image. This plane may or may not coincide with the virtual original pattern plane (VOPP).

The next step (r) consists of applying a third virtual net onto final virtual image plane (FVIP), whereby a plurality of third virtual unit cells is formed. (This step is not illustrated because it is similar to one shown in FIG. 3). In the third virtual unit cells, the second individual light sources (SIVLS1, SIVLS2 ... SIVLSk) generate a fourth electromagnetic field (REF).

Figure 9:
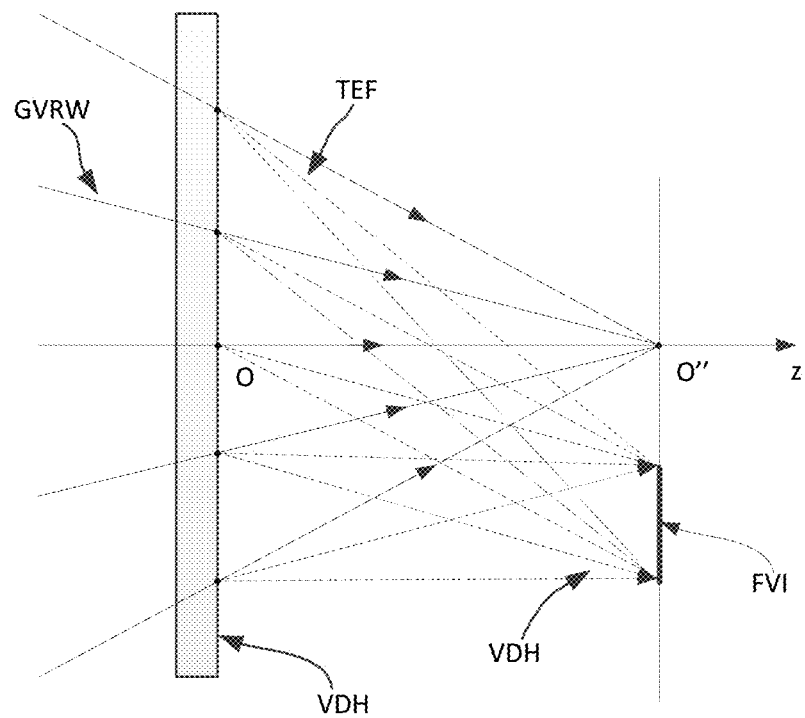
FIG. 9 is a side view of a step at which amplitudes and phases of the fourth electromagnetic field (REF) are calculated.

Step (s), which is shown in FIG. 9, consists of calculating amplitudes and phases of the fourth electromagnetic field (REF). This drawing illustrates a case wherein point O" is in the final virtual image plane.

Figure 10:
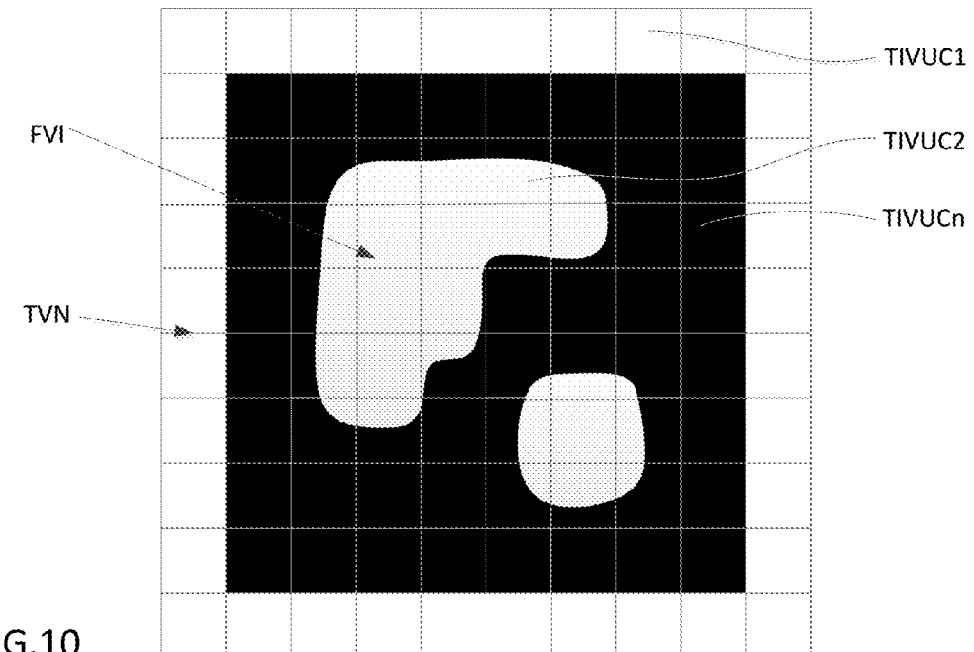
FIG. 10 is a plan view illustrating results of the step in the values of the final virtual image (FVI) are calculated in the third virtual unit cells based on amplitudes and phases of the fourth electromagnetic field (REF).

Step (t), which is shown in FIG. 10, consists of calculating the values of the final virtual image FVI in the third virtual unit cells (TIVUC1, TIVUC2, . . . TIVUCn) based on amplitudes and phases of the fourth electromagnetic field (REF) calculated in step (r).

Figure 11:
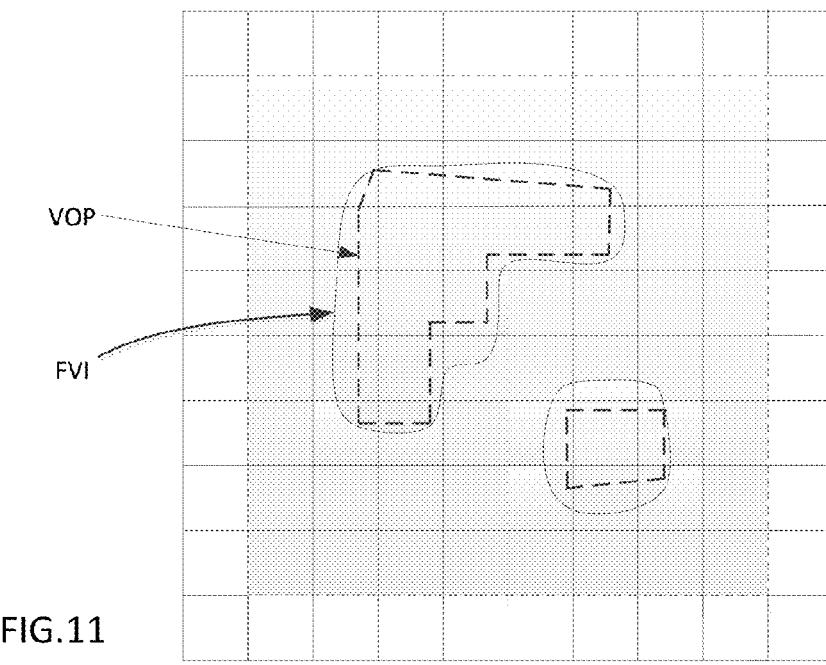
FIG. 11 illustrates introduction of a criterion for comparing the final virtual image (FVI) and the virtual original pattern (VOP).

Step (u) consists of introducing a criterion for matching the final virtual image (FVI) and the virtual original pattern (VOP) (FIG. 11).

In step (v) the final virtual image (FVI) is compared with the virtual original pattern (VOP) (FIG. 11) based on the criterion of matching if deviations are obtained. Such a creation may be, e.g., matching of the dimensions of the pattern elements of the final virtual image (FVI) and the with the virtual original pattern (VOP) to a certain percent or position of the decimal point in the digital number of the image. In other words, the criterion of matching is pre-defined as a given allowable deviation.

Step (w) is minimizing the above deviation, if any, by repeating steps (h), (i), (k), (n), (o), (p), (s), (t), and (v) until a satisfactory value of the criterion of matching is achieved, thus obtaining the final virtual digital hologram.

As mentioned earlier, in the steps from (a) to (w) the wavelength $\lambda$ was constant and equal to $\lambda_1$. The following description relates to the case where in the hologram generation process scaling is carried out by changing the wavelength.

Strictly speaking, all parameters of sequential virtual steps that occur in case of iteration, such as unit cells, electromagnetic fields, nets, etc., except for $\lambda_1$, are slightly changed. However, for simplicity of the description and drawings these changes can be neglected without deviation from the principle of the present invention. Therefore, in the previous description and hereinafter the aforementioned parameters are assumed to be constant.

In this case, next, in step (x), the given virtual restoration wave (GVRW) with wavelength $\lambda_{min}$ passes through the virtual digital hologram plane (VDHP), thus forming a plurality of third individual virtual light sources (TIVLS1, TIVLS2, . . . TIVLSk) in the second virtual unit cells. The third individual virtual light sources (TIVLS1, TIVLS2, . . . TIVLSk) generate a fifth electromagnetic field (FiEF) in the virtual digital hologram plane (VDHP). Scaling coefficient is set to $K=\lambda_{min}/\lambda_1$.

The next step (y) consists of selecting a nontransparent restricted area (NTRA) in the virtual original pattern plane (VOPP) and placing the respectively scaled virtual original pattern (SVOP) in the nontransparent restricted area (NTRA) of the virtual original pattern plane (VOPP). The scaled virtual original pattern (SVOP) is formed by respectively scaled virtual image elements (SVIE).

The next step (z) consists of applying a fourth virtual net onto final virtual image plane (FVIP), which is respectively scaled third virtual net.

Step (aa) consists of calculating amplitudes and phases of the sixth electromagnetic field (SXEF) on the a fourth virtual net on the final virtual image plane (FVIP) generated by the third individual virtual light sources (TIVLS1, TIVLS2, . . . TIVLSk).

Step (ab) consists of calculating the values of the scaled final virtual image SFVI in the third virtual unit cells (TIVUC1, TIVUC2, . . . TIVUCn) based on amplitudes and phases of the sixth electromagnetic field (SEF) calculated in step (aa).

In step (ac) the scaled final virtual image (SFVI) is compared with the scaled virtual original pattern (SVOP) based on the criterion of matching if deviations are obtained, where the criterion of matching is predefined as a given allowable deviation, and obtaining a target scaled virtual image.

Following this, the steps (x), (y), (z), (aa), (ab), (ac) are repeated with $\lambda_{min}$ value moved closer to $\lambda_1$ until the criteria are matched.

Upon completions of iterations with $\lambda_{min}$ the steps (x), (y), (z), (aa), (ab), (ac) and (ad) are repeated for $\lambda_{max}$.

Figures 12A, 12B, 12C:
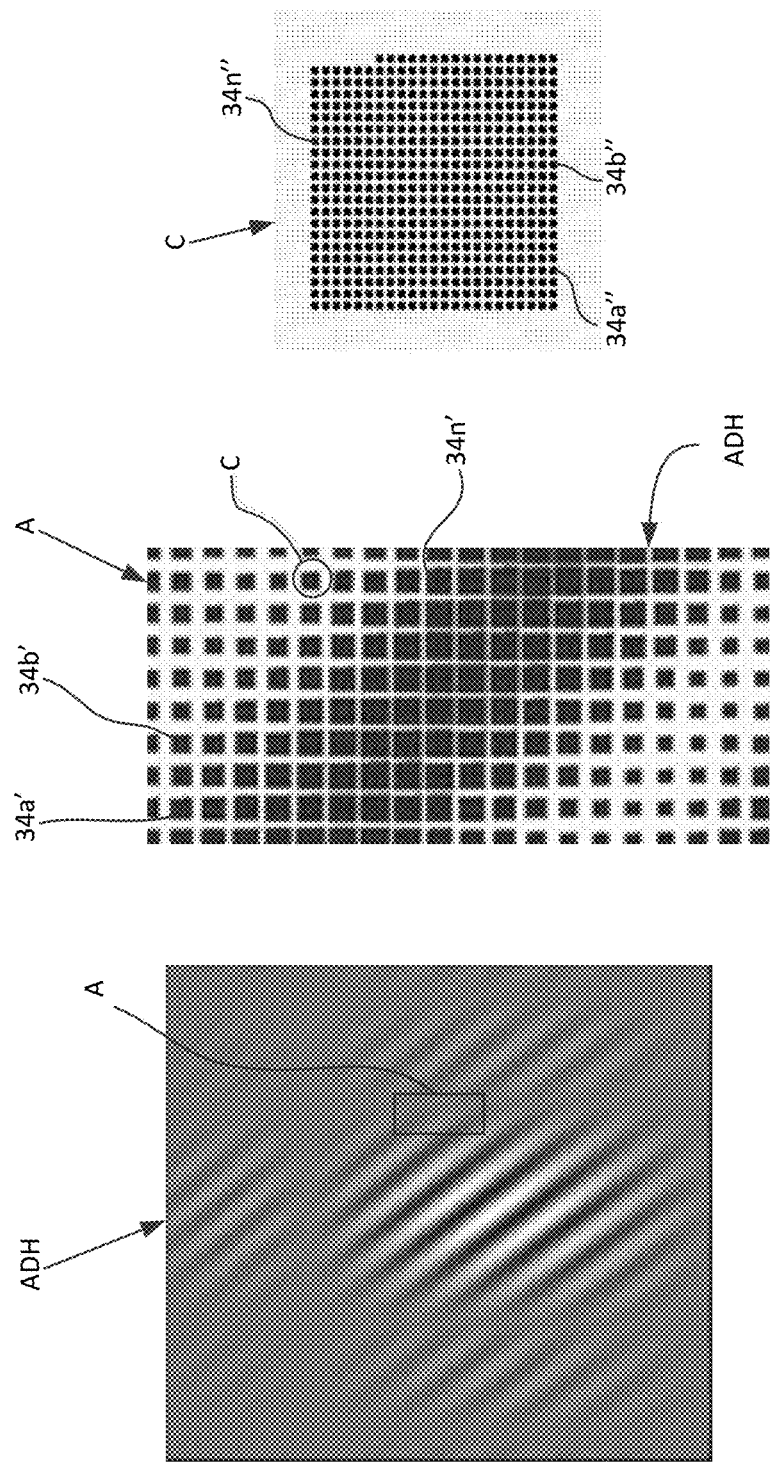
FIG. 12A is a top view of an actual digital hologram.
FIG. 12B is a top view of a rectangular area A marked in FIG. 12A that shows a plurality of holes of different dimensions formed in the nontransparent layer described in connection with FIG. 13.
FIG. 12C is a top view of an area C marked in FIG. 12B shown on a larger scale.

The final step (w) consists of manufacturing the actual digital hologram (ADH) on a hologram manufacturing apparatus (not shown) based on the final virtual digital hologram. FIG. 12A is a top view of an actual digital hologram (ADH). FIG. 12B is an enlarged picture of the rectangular area A marked in FIG. 12A.

In case of manufacturing the actual digital hologram (ADH) with use of scaling a practical holographic lithography machine should be equipped with a parametric laser having a given degree of coherency and output power and capable of operating with different wavelength, etc.

According to one or several aspects of the invention, the electromagnetic field generated by the plurality of the first individual virtual light sources (FIVLS1, FIVLS2, . . . FIVLSm) in a certain plane, which is spaced at a certain distance from the plane (VOPP), can be expressed in a scalar approximation by formula (1):

$$u(x, y, z) = \int_{-\infty}^{\infty}\int_{-\infty}^{\infty} V(x', y')G(x-x', y-y', z)dx'dy' \qquad (1)$$

where:

V(x',y') is an electromagnetic field in the (VOPP) plane (in other words, the distribution of phases and amplitudes of this electromagnetic field is equivalent to those of the first individual virtual light sources (FIVLS1, FIVLS2, . . . , FIVLSm), themselves).

$$G(x, y, z) = -\frac{\partial}{\partial z}\left(\frac{e^{ikr}}{2\pi r}\right);$$

where:

$r=\sqrt{x^2+y^2+z^2}$, and k is a wave number equal to $2\pi/\lambda$.

In the case illustrated in FIGS. 1 to 3, the aforementioned certain plane is the virtual digital hologram plane (VDHP) that is spaced from the virtual original pattern plane (VOPP) at distance D.

Therefore, formula (1) can be written as follows:

$$U(x, y) = \int\int_S V(x', y')G(x-x', y-y', D)dx'dy', \qquad (2)$$

where:

S is the nontransparent restricted area (NTRA) shown in FIG. 2.

According to another aspect of the invention, numerical calculation of the amplitude and phase in the second virtual unit cells is carried out based on the fast Fourier transform.

According to one or several aspects of the invention, in the formation of the final actual virtual image (FAIFVI), the aforementioned given virtual restoration wave is identical to the actual restoration wave (ARW), which is used to illuminate the actual digital hologram (ADH) and to obtain the final actual image (FAI).

Figure 13:
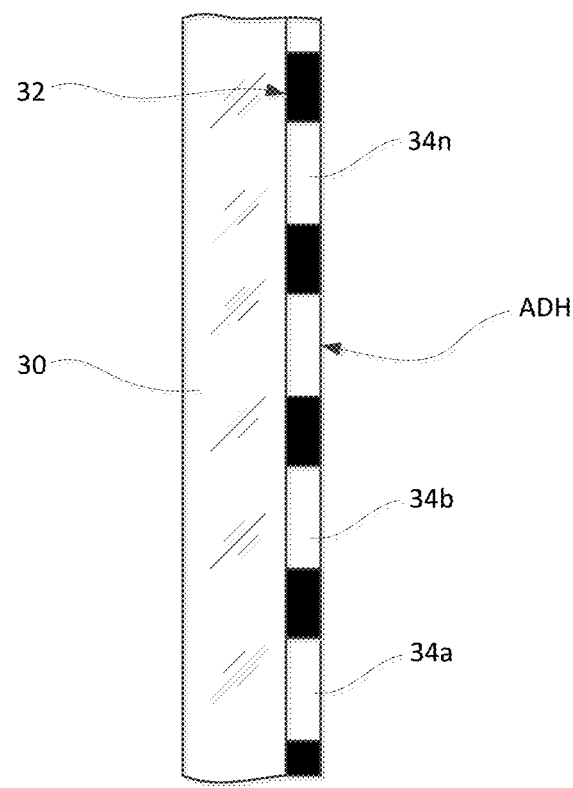
FIG. 13 is a sectional view of the final actual hologram with a set of holes of equal dimensions formed in the nontransparent layer for changing the amplitude of the actual restoration wave.

The actual digital hologram (ADH) is made in the form of a set of holes formed in a nontransparent layer. This is shown in FIG. 13, which is a fragment of a cross section through the actual digital hologram. In this drawing, reference numeral 30 designates a transparent substrate made, e.g., from fused silica (quartz), reference numeral 32 designates a nontransparent layer applied onto the transparent layer 30, and reference numerals 34a, 34b, . . . 34n designate holes made in the nontransparent layer 32.

As shown in FIG. 12B, the actual digital hologram (ADH) can be made in the form of a set of holes 34a', 34b', . . . 34n' of a variable size formed in a nontransparent layer 32', where one such hole of a predetermined size corresponds to an appropriate second virtual unit cell of the virtual digital hologram.

FIG. 12C is a top view of an area C marked in FIG. 12B shown on a larger scale. In the illustrated case the area C of FIG. 12B comprises a single unit cell of the ADH that corresponds to one of the second virtual unit cells mentioned in step i) of the method of the invention. This cell contains "n" holes such a hole 34a", 34b", . . . 34n". In fact, the number of the hole may vary from 1 to "n" or greater.

Although the invention has been shown and described with reference to specific embodiments, it is understood that these embodiments should not be construed as limiting the areas of application of the invention and that any changes and modifications are possible, provided that these changes and modifications do not depart from the scope of the attached patent claims. Thus, the following criteria can be used for evaluating the level of matching of the final virtual image (FVI) to the virtual original pattern (VOP): a maximal difference of intensities or amplitudes in the unit cells that coincide in coordinates of the virtual original pattern (VOP) and the final virtual image (FVI); a sum of absolute differences in (a) intensities or (b) amplitudes of all cells of virtual original pattern (VOP) and the final virtual image (FVI); a sum of squared differences in (a) intensities or (b) amplitudes of all cells of virtual original pattern (VOP) and the final virtual image (FVI); a sum of arbitrary degree differences in (a) intensities or (b) amplitudes of all cells of virtual original pattern (VOP) and the final virtual image (FVI). The criteria for matching the final virtual image (FVI) and the virtual original pattern (VOP) can also comprise a mathematical model of interaction between the fourth electromagnetic field (REF) and the exposed photosensitive material. Corrections of the first individual virtual light sources (FIVLS1, FIVLS2, . . . FIVLSm) can be made by a local variation comparison method or by any gradient method. The virtual digital hologram can also be corrected by a method of local variations or by any gradient method. The identities of the given virtual restoration wave (GWRV) and the actual restoration wave (ARW), which are used in the photolithography apparatus for illuminating the actual digital hologram (ADH) and obtaining the final actual image, are provided by an accurate aberration calculation of the optical system or by measuring the wave front of the actual restoration wave (ARW).

What is claimed is:

1. A method of static scaling of an original pattern in a predetermined size for obtaining said original pattern in another size in holographic lithography, the method comprising the steps of:

providing an original pattern;

generating a final virtual digital hologram of the original pattern through a sequence of mathematically calculated steps with participation of virtual coherent light source having a predetermined wavelength $\lambda_1$;

producing an actual hologram on the basis of the virtual digital hologram of the original pattern;

virtually determining a minimal wavelength $\lambda_{min}$ and a maximal wavelength $\lambda_{max}$ of the allowable wavelength variation range in which scalability is possible with substantially homothetic transformation;

providing an actual laser light source with the wavelength $\lambda_1$ variable in the range between $\lambda_{min}$ and $\lambda_{max}$, where $\lambda_{min}$ is the minimal wavelength and $\lambda_{max}$ is the maximal wavelength at which the homothetic transformation is possible;

selecting a wavelength $\lambda_2$ in the range between $\lambda_{min}$ and $\lambda_{max}$ and setting the actual laser light source for operation on the wavelength $\lambda_2$; and producing the original pattern in another size by using the actual laser light source with the wavelength $\lambda_2$, wherein the allowable wavelength variation range satisfies the following condition:

$$k\,\delta^3(K^2-1)/D^2 \ll 1,$$

where k is a wave vector; K is a scaling coefficient equal to $=\lambda_2/\lambda_1$; $\delta$ is a parameter that characterizes the size of the original pattern and D is a distance from a plane of the actual laser light source to a screen.

2. The method of claim 1, wherein the sequence of mathematically calculated steps for generating the final virtual digital hologram comprises the following steps:

(a) introducing an orthogonal coordinate system x, y, z having three mutually perpendicular axes X-X, Y-Y, and Z-Z, choosing a point O on the axis Z-Z, and passing through this point a virtual digital hologram plane (VDHP), which is perpendicular to the axis Z-Z and which is to be used as a plane of the virtual digital hologram (VDHP) for manufacturing the actual digital hologram;

(b) selecting an orthogonal coordinate system x', y', z having three mutually perpendicular axes X'-X', Y'-Y', and Z-Z, choosing a point O' on the axis Z-Z that is spaced from the virtual digital hologram plane (VDHP) at a certain distance "d" and passing through this point O' a virtual original pattern plane (VOPP) that contains a virtual original pattern and is perpendicular to said arbitrary axis Z-Z, and wherein the virtual original pattern that contains image elements is to be used for subsequent synthesis of the virtual digital hologram;

(c) selecting a nontransparent restricted area NTRA in the virtual original pattern plane (VOPP) and placing the virtual original pattern (VOP) in the nontransparent restricted area NTRA of the virtual original pattern plane (VOPP), the virtual original pattern (VOP) being formed by virtual image elements VIE; the parameter $\delta$ being a distance from point O' to the most remote point on the virtual image element VIE;

(d) applying onto the virtual original pattern plane (VOPP) a first virtual net FVN that divides the nontransparent restricted area (NTRA) into a plurality of first virtual unit cells;

e) classifying the first virtual unit cells into white first virtual unit cells, black first virtual unit cells, and grey first virtual unit cells, wherein a white first virtual unit cell is obtained if a first virtual unit cell of the first net overlaps the virtual image elements of the virtual original pattern, a black first virtual unit cell is obtained if a first virtual unit cell of the first net overlaps only a space between the adjacent virtual image elements, and a grey virtual unit cell is obtained if a first virtual unit cell of the first net overlaps adjacent virtual image elements and a space between the adjacent virtual image elements;

(f) presenting the virtual original pattern (VOP) in the form of a virtual digital amplitude-phase mask, wherein each first virtual unit cell is assigned a transmission value so that white first virtual unit cells are assigned a transmission value of 1.0, black first virtual unit cells are assigned a transmission value of 0.0, and grey first virtual unit cells are assigned a transmission value in the range of 0.0 to 1.0; all areas beyond the restricted area are assigned an amplitude value of 0.0; and wherein each first virtual unit cell has a function of a rotational phase shifter for shifting the phase in each respective first virtual unit cell when this first virtual unit cell passes the light of a first virtual light wave that has a given phase and amplitude, which are changed individually in each first virtual unit cell when the first virtual light wave FVLW passes through this cell, whereby a plurality of first individual virtual light sources selected from the group of point light sources and/or extended light sources is formed, and wherein each first individual virtual light source of said plurality acquires a precalculated phase and amplitude;

(g) carrying out an auxiliary correction of said acquired precalculated phase and amplitude for each first individual virtual light source of said plurality for obtaining a post-calculated distribution of said phase and amplitude of the first individual virtual light sources of said plurality;

(h) fixing the obtained post-calculated distribution of said phase and amplitude of the first individual virtual light sources of said plurality, said first individual virtual light sources generating a first electromagnetic field, the first electromagnetic field (FEF) operating on said wavelength $\lambda_1$;

(i) applying a second virtual net onto the plane of the virtual digital hologram, thus dividing the plane of the virtual digital hologram into a plurality of second virtual unit cells and generating with the first light sources of said plurality a second electromagnetic field in the second virtual unit cells of the virtual digital hologram plane, the second electromagnetic field (SEF) operating on the same wavelength $\lambda_1$;

(j) calculating an amplitude and phase of the second electromagnetic field in the virtual digital hologram plane from the first light sources of said plurality by numerical calculation;

(k) providing a given virtual restoration wave that propagates from the virtual digital hologram plane to the virtual original pattern plane for subsequent restoration of the final virtual image and comprises a spherical or a nonspherical wave that converges to point O'', which may or may not coincide with point O' on the virtual original pattern plane (VOPP);

(l) inverting the given virtual restoration wave into a virtual reference wave to be used for calculating the virtual digital hologram;

(m) adding the virtual reference wave to the second electromagnetic field obtained in the second virtual unit cells for calculating interference amplitudes and phases obtained as a result of interference of the second electromagnetic field obtained from the first virtual light sources with the virtual reference wave;

(n) calculating the values of the virtual digital hologram in the second virtual unit cells based on the interference amplitudes and phases in each second virtual unit cell;

(o) passing the given virtual restoration wave through the virtual digital hologram plane, thus forming a plurality of second individual virtual light sources in the second unit cells, the second individual virtual light generating a third electromagnetic field in the virtual digital hologram plane;

(p) selecting a final virtual image plane for subsequent formation of the final virtual image, the final virtual image plane coinciding or not coinciding with the virtual original pattern plane (VOPP);

(q) applying a third virtual net onto the final virtual image plane, thus forming a plurality of third virtual units, the second individual light sources generating a fourth electromagnetic field in the third virtual unit cells;

(r) calculating amplitudes and phases of the fourth electromagnetic field;

(s) calculating the values of the final virtual image in the third virtual unit cells based on amplitudes and phases of the fourth electromagnetic field (REF) calculated in step (r);

(t) introducing a criterion of matching between the final virtual image and the virtual original pattern;

(u) comparing the final virtual image with the virtual original pattern based on the criterion of matching if deviations are present; and (v) minimizing the above deviation, if any, by repeating the steps (g), (h), (j), (m), (n), (o), (r), (s), and (u) until a satisfactory value of the criterion of matching is achieved and thus obtaining the final virtual digital hologram.

3. The method of claim 2, wherein the static scaling of an original pattern in a predetermined size for obtaining said original pattern in another size comprises the following steps of:

(w) passing the given virtual restoration wave (GVRW) with wavelength $\lambda_{min}$ through the virtual digital hologram plane (VDHP), thus forming a plurality of third individual virtual light sources (TIVLS1, TIVLS2, ... TIVLSk) in the second virtual unit cells;

(x) generating a fifth electromagnetic field (FiEF) in the virtual digital hologram plane (VDHP) by using the third individual virtual light sources (TIVLS1, TIVLS2, ... TIVLSk);

(y) forming a scaled virtual original pattern by repeating the steps (a) to (v) for the wavelength $\lambda_{min}$;

(z) selecting a second nontransparent restricted area (NTRA) in the virtual original pattern plane (VOPP) and placing the respectively scaled virtual original pattern (SVOP) in the second nontransparent restricted area (NTRA) of the virtual original pattern plane (VOPP);

(aa) calculating amplitudes and phases of a sixth electromagnetic field (SXEF) on the a fourth virtual net in the final virtual image plane (FVIP) generated by the third individual virtual light sources (TIVLS1, TIVLS2, ... TIVLSk), (ab) calculating the values of a final scaled virtual image SFVI in the third virtual unit cells (TIVUC1, TIVUC2, . . . TIVUCn) based on the amplitudes and phases of the sixth electromagnetic field (SEF) calculated in step (aa), and (ac) comparing the final scaled virtual image (SFVI) with the scaled virtual original pattern (SVOP) based on the criterion of matching if deviations are obtained, where the criterion of matching is predefined as a given allowable deviation.

4. The method of claim 3, comprising the step (ad) of repeating the steps from (W) to (ac) for wavelength $\lambda_{max}$.

5. The method of claim 4, comprising the step of manufacturing the actual digital hologram (ADH) by holographic lithography on a hologram manufacturing apparatus based on the target final virtual image.

6. The method of claim 2, wherein the second electromagnetic field generated in the virtual digital hologram plane (VDHP) by a plurality of the first individual virtual light sources is expressed by the following formula (2):

$$U(x, y) = \int\int_S V(x', y')G(x - x', y - y', D)dx'\,dy' \qquad (2)$$

where:

V(x,y) is an electromagnetic field in the virtual original pattern plane (VOPP);

$$G(x, y, z) = -\frac{\partial}{\partial z}\left(\frac{e^{ikr}}{2\pi r}\right);$$

where: $r = \sqrt{x^2+y^2+z^2}$ k is a wave number equal to $2\pi/\lambda$, and

S is the nontransparent restricted area.

7. The method of claim 5, wherein the second electromagnetic field generated in the virtual digital hologram plane (VDHP) by a plurality of the first individual virtual light sources is expressed by the following formula (2):

$$U(x, y) = \int\int_S V(x', y')G(x - x', y - y', D)dx'\,dy' \qquad (2)$$

where:

V(x,y) is an electromagnetic field in the virtual original pattern plane (VOPP);

$$G(x, y, z) = -\frac{\partial}{\partial z}\left(\frac{e^{ikr}}{2\pi r}\right);$$

where: $r = \sqrt{x^2+y^2+z^2}$ k is a wave number equal to $2\pi/\lambda$, and

S is the nontransparent restricted area.

8. The method of claim 2, wherein numerical calculation of the amplitude and phase in the second virtual units is carried out based on the fast Fourier transform.

9. The method of claim 5, wherein numerical calculation of the amplitude and phase in the second virtual units is carried out based on the fast Fourier transform.

10. The method of claim 7, wherein numerical calculation of the amplitude and phase in the second virtual units is carried out based on the fast Fourier transform.

11. The method of claim 2, wherein the aforementioned given virtual restoration wave is identical to an actual restoration wave (ARW), which is used for illuminating the actual digital hologram (ADH) and obtaining the final actual image.

12. The method of claim 5, wherein the aforementioned given virtual restoration wave is identical to an actual restoration wave (ARW), which is used for illuminating the actual digital (ADH) and obtaining the final actual image.

* * * * *